(12) United States Patent
Kroening

(10) Patent No.: US 10,033,515 B2
(45) Date of Patent: Jul. 24, 2018

(54) SYSTEMS AND METHODS FOR RADIO FREQUENCY ENERGY MULTIPLEXERS

(71) Applicant: Honeywell International Inc., Morris Plains, NJ (US)

(72) Inventor: Adam M. Kroening, Atlanta, GA (US)

(73) Assignee: Honeywell International Inc., Morris Plains, NJ (US)

( * ) Notice: Subject to any disclaimer, the term of this patent is extended or adjusted under 35 U.S.C. 154(b) by 74 days.

(21) Appl. No.: 14/948,049

(22) Filed: Nov. 20, 2015

(65) Prior Publication Data

US 2017/0149551 A1     May 25, 2017

(51) Int. Cl.
    *H04L 5/16*     (2006.01)
    *H04L 5/10*     (2006.01)

(52) U.S. Cl.
    CPC . *H04L 5/16* (2013.01); *H04L 5/10* (2013.01)

(58) Field of Classification Search
    CPC ..... H04J 14/0204; H04J 14/0212; H04L 5/16; H04L 5/10; G02B 6/2938; G02B 6/2932; G02B 6/29395
    See application file for complete search history.

(56) References Cited

U.S. PATENT DOCUMENTS

| | | | |
|---|---|---|---|
| 3,587,009 A | 6/1971 | Kibler | |
| 4,029,902 A | 6/1977 | Bell, Jr. et al. | |
| 6,304,370 B1 * | 10/2001 | Barnard | H04B 10/291 359/341.1 |
| 6,483,618 B2 * | 11/2002 | Amin | G02B 6/2932 385/24 |
| 7,719,384 B1 | 5/2010 | Arceo et al. | |
| 7,816,995 B1 | 10/2010 | Allen et al. | |

(Continued)

FOREIGN PATENT DOCUMENTS

| | | |
|---|---|---|
| EP | 2693560 | 2/2014 |
| EP | 2930783 | 10/2015 |
| WO | 03041213 | 5/2003 |

OTHER PUBLICATIONS

Ahmad et al., "Diplexer design for 4G Mobile Communication using Lumped Component Filters", "Journal of Basic and Applied Scientific Research", Dec. 2013, pp. 1-15, Publisher: Hacettepe University, Published in: Islamabad, Pakistan.

Skaik et al., "Synthesis of multiple output coupled resonator circuits using coupling matrix optimisation", "IET Microwaves, Antennas & Propagation", Jun. 27, 2011, pp. 1081-1088, vol. 5, No. 9, Publisher: The Institute of Engineering and Technology.

Tubail, "Synthesis of Multiplexers Based on Coupled Resonator Structures Using Coupling Matrix Optimization", Dec. 2013, No. 1-86, Publisher: The Islamic University of Gaza.

(Continued)

*Primary Examiner* — Min Jung
(74) *Attorney, Agent, or Firm* — Fogg & Powers LLC

(57) ABSTRACT

Systems and Methods for RF Energy Multiplexers are provided. In one embodiment, a multiplexer comprises: a multiplexer stage that includes: a first three port device coupled to a first port of the multiplexer and a first reflective filter, wherein the first reflective filter has a pass band that passes energy at a first frequency, and reflects energy at at least one of a second frequency outside of the pass band back into the first three port device; and a first filtered-load sub-stage coupled to the first three port device, the sub-stage comprising a second three port device coupled to a second reflective filter and a first absorbing load, where the second reflective filter passes energy at the first frequency to the first absorbing load and reflects energy at the at least one of a second frequency outside of the first pass band back into the second three port device.

19 Claims, 8 Drawing Sheets

(56) References Cited

U.S. PATENT DOCUMENTS

| | | | |
|---|---|---|---|
| 7,994,469 B2* | 8/2011 | Goldner | H04J 14/02 |
| | | | 250/227.14 |
| 8,264,298 B2 | 9/2012 | Kenington | |
| 8,421,554 B2 | 4/2013 | Kenington | |
| 8,761,026 B1 | 6/2014 | Berry et al. | |
| 8,947,173 B2 | 2/2015 | Kroening | |
| 2002/0181831 A1* | 12/2002 | Myers | G02B 6/272 |
| | | | 385/15 |
| 2007/0252661 A1 | 11/2007 | Downs et al. | |
| 2008/0062408 A1* | 3/2008 | Lai | H04J 14/0282 |
| | | | 356/73.1 |
| 2011/0193649 A1 | 8/2011 | Popelka et al. | |
| 2012/0007605 A1 | 1/2012 | Benedikt | |
| 2013/0089324 A1* | 4/2013 | Eiselt | H04B 10/40 |
| | | | 398/34 |
| 2013/0169379 A1 | 7/2013 | Holme et al. | |
| 2017/0019168 A1* | 1/2017 | Menard | G02B 6/29395 |

OTHER PUBLICATIONS

Xia, "Diplexers and Multiplexers Design by Using Coupling Matrix Optimisation", Apr. 2015, pp. 1-202, Publisher: The University of Birmingham School of Electronic, Electrical and Systems Engineering.

European Patent Office, "Extended European Search Report for EP Application No. 16197189.0", "Foreign Counterpart to U.S. Appl. No.", Apr. 19, 2017, pp. 1-8, Published in: EP.

Cameron, Richard et al, "Design of Manifold-coupled Multiplexers", "IEEE Microwave Magazine", Oct. 1, 2007, pp. 46-59, Publisher: IEEE.

Ahmad et al, "Diplexer design for 4G Mobile Communication using Distributed Component Filters", "Journal of Basic and Applied Scientific Research", Jan. 2014, pp. 1-19, Publisher: TextRoad Publication.

* cited by examiner

SYSTEMS AND METHODS FOR RADIO FREQUENCY ENERGY MULTIPLEXERS

BACKGROUND

A conventional radio frequency (RF) energy multiplexer (as the term is used herein) is a network of elements that may be used to separate RF signals of multiple frequencies received from a common port out to multiple ports sorted by frequency. For example, a single antenna may receive signals at multiple frequencies or channels, and a multiplexer can be used to separate out the channels for individual processing of the information carried on each channel. Such RF energy multiplexers are often implemented using three junction devices, such as circulators, to send the compound signal through a cascade of individual band pass filters that separate out each channel. Frequencies outside of each pass band filter will continue reflecting off filters down the cascade path until reaching a filter with the correct pass band. At that point the signal for a particular channel will exit the multiplexer. At higher frequencies such as Ku-band and higher, filters used to implement RF multiplexers are generally large waveguide structures with complicated features such as irises or rectangular/circular waveguide transitions that cannot be easily integrated with the ferrite switching networks and antenna systems. Further, due to tolerance sensitivities of the filter elements, the passband of the filters must be fine-tuned, often by hand, to get the filter bandwidths correct and coordinated across the multiplexer.

For the reasons stated above and for other reasons stated below which will become apparent to those skilled in the art upon reading and understanding the specification, there is a need in the art for alternate and improved systems and methods for providing RF energy multiplexers.

SUMMARY

The Embodiments of the present invention provide methods and systems for providing RF energy multiplexers and will be understood by reading and studying the following specification.

In one embodiment, a radio frequency (RF) energy multiplexer comprises: a first multiplexer stage that includes: a first three port device coupled to a first port of the multiplexer and a first reflective filter device, wherein the first reflective filter device is configured with a first pass band that passes RF energy at a first frequency F1, and reflects RF energy at at least one of a second frequency F2 outside of the first pass band back into the first three port device; and at least a first filtered load sub-stage coupled to a third port of the first three port device, the first filtered load sub-stage comprising a second three port device coupled to a second reflective filter device and a first absorbing load termination, where the second reflective filter device passes RF energy at the first frequency F1 to the first absorbing load termination and reflects RF energy at the at least one of a second frequency F2 outside of the first pass band back into the second three port device.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure provide system and methods for RF multiplexers that are designed to utilize simpler filter elements that are smaller in size, easier to manufacture, and can be packaged together with other RF components.

Figure 1:
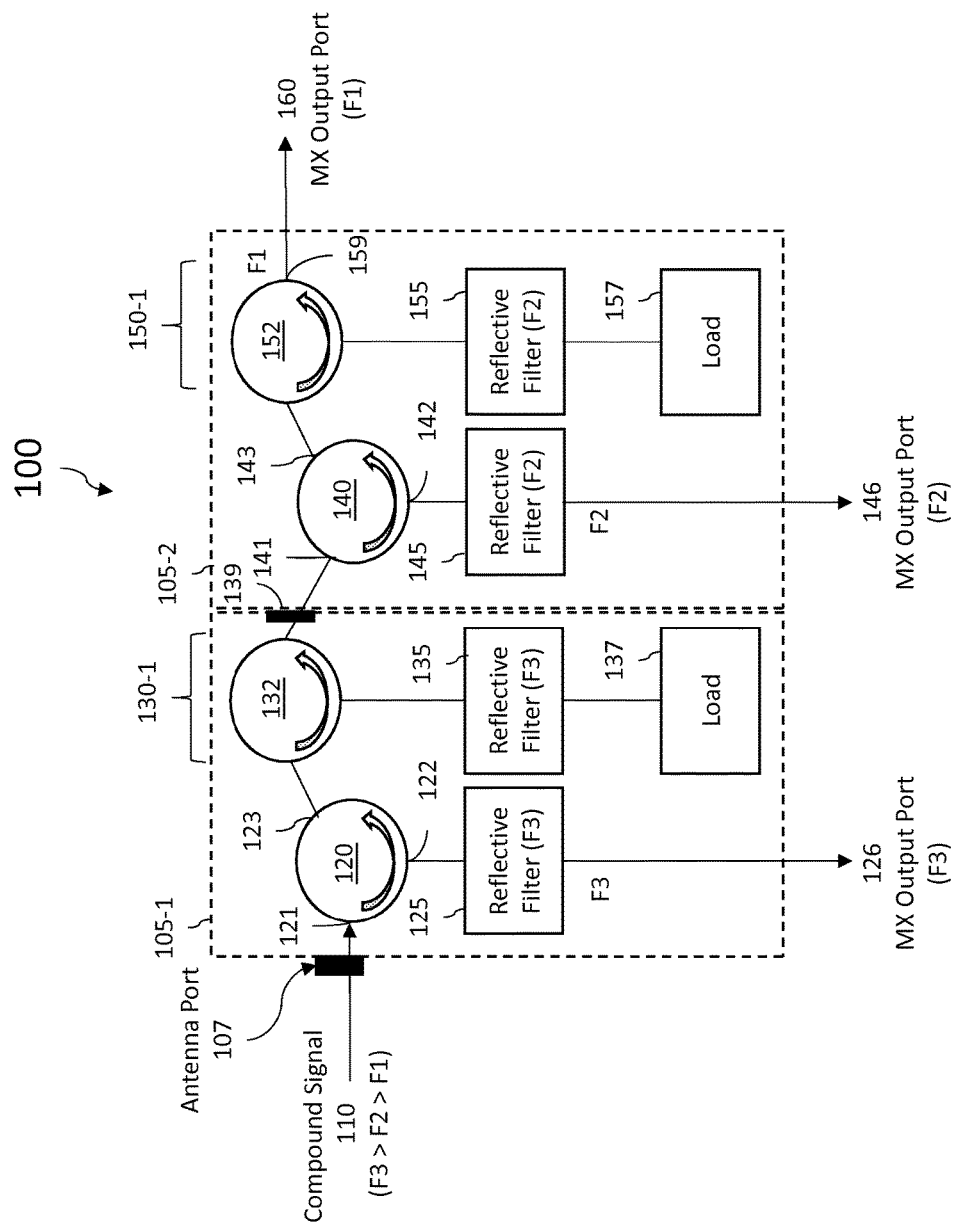
FIG. 1 is a diagram illustrating an RF energy multiplexer of one embodiment of the present disclosure

FIG. 1 is a diagram illustrating an RF energy multiplexer 100 of one embodiment of the present disclosure. In the particular implementation shown in FIG. 1, RF multiplexer 100 comprises a first frequency stage 105-1 and a second frequency stage 105-2 (collectively referred to as frequency stages 105), with which it may processes an incoming RF signal comprising three frequency bands or channels. As explained below, in other implementations, RF multiplexer 100 may comprise one or more such frequency stages 105.

As shown in FIG. 1, first frequency stage 105-1 is coupled to an antenna port interface 107 which may be coupled to antenna, coaxial cable, or other source of incoming RF energy signals. The incoming signal 110 is a compound signal comprising a plurality of distinct signals that occupy specific frequency bands. The present application may also refer to these frequency bands as a "channel" though it should be appreciated that this term is simply referring to a bound bandwidth of RF energy centered at a nominal frequency associated with that channel/frequency band. For the example of FIG. 1, the incoming signal 110 is defined as comprising three signals each in a separate frequency band referred to herein as frequency 1 (F1) frequency 2 (F2), and frequency 3 (F3), where F3>F2>F1. For the sake of simplicity of explanation, each signal is assumed to be received at a power level of 0 dBm (i.e., 1 milliwatt), though the embodiments discussed herein are not limited to signal of this power level.

The incoming signal 110 enters first frequency stage 105-1 and is applied to the input 121 of a first circulator 120. The applied RF energy propagates around to output port 122 and is applied to a first reflective filter element 125. In this particular embodiment, first reflective filter element 125 comprises a high pass filter (HPF). The first reflective filter element 125 has a cutoff frequency and passband tuned to pass signals at F3 or higher to multiplexer output port 126 while reflecting energy at frequencies below its passband. Filter element 125 is referred to as a reflective filter element which in the context of this disclosure means that RF energy not passed through the filter is reflected back from the port to which is was applied. Accordingly, the RF signals at frequencies F2 and F1 applied to the first filter element 125 are outside the passband and therefore are almost entirely reflected with negligible loss back into the first circulator 120. Any RF power that does happen to leak through first filter element 120 at F2 and F1 to exit multiplexer output 126 will be considerably attenuated and negligible, for example by 40 dB or more. Because no coupling is perfect, there will also be some reflection of RF energy at frequency F3 back into circulator 120. For example, in many applications, a reflective loss at F3 on the order of −20 dBm could be expected. Because this embodiment forgoes the use of bandpass filters in order to optimize weight, size and tuning sensitivity concerns, the multiplexer frequency stage 105-1 needs some other way to absorb the reflected energy at frequency F3 before it propagates out from multiplexer frequency stage 105-1. To address this reflected loss, multiplexer frequency stage 105-1 comprises one or more filtered load sub-stages. Here, a first filtered load sub-stage 130-1 is coupled to the output 123 of the first circulator 120. This RF energy from the first circulator 120 is coupled into a second circulator 132 and directed out to another reflective filter device 135 that is in turn coupled an absorbing load termination 137.

Within the filtered load sub-stage 130-1, the second reflective filter device 135 has a cutoff frequency that is also tuned to pass frequency F3 into an absorbing load termination 137 while RF energy at frequencies F2 and F1 are again almost entirely reflected with negligible loss back into the second circulator 132. As before, there may still be some return loss at frequency F3 from the second reflective filter device 135 back into the second circulator 132, but this energy will be still further attenuated, for example on the order of another 20 dB. That is, any remaining energy at frequency F3 at this point would be attenuated from the initial 0 dBm power level down to about −40 dBm. The RF energy reflected back into the second circulator 132 from reflective filter element 135 will travel around and exit at the second circulator 132 at output port 139. As a result, the signal exiting the first multiplexer 105-1 stage will comprise RF signal components at frequencies F2 and F1 with nearly no loss (0 dBm) while the signal that entered stage 105-1 at frequency F3 will be considerably attenuated, for example down to −40 dBm which for many applications is below a negligible noise level. If a greater amount of attenuation of frequency F3 is desired, then the first stage 105-1 may further comprise one or more additional filtered load sub-stages 130 in series after sub-stage 130-1 that further attenuate frequency F3 while reflecting F2 and F1 in the same manner as described with the first filtered load sub-stage 130-1.

The second multiplexer frequency stage 105-2 operates in the same manner as the first frequency stage 105-1, except that its reflective filter elements 145, 155 are tuned to pass RF energy at frequencies F2 and higher while reflecting frequencies below its passband. The RF energy at frequencies F2 and F1 enter the second multiplexer stage 105-2 at the input 141 of a first circulator 140 and propagate around to output port 142 where it is applied to reflective filter element 145. Reflective filter element 145 has a cutoff frequency and passband tuned to pass signals at F2 or higher to multiplexer output port 146 while reflecting energy at frequencies below its passband. Any RF energy at frequency F1 that leaks through filter element 145 at F1 to exit multiplexer output port 146 will be considerably attenuated, for example by 40 dB or more.

There will also be some reflection of RF energy at frequency F2 back into circulator 140. For example, a reflected power level at F2 on the order of −20 dBm could be expected. To address this reflected loss, frequency stage 105-2 also comprises one or more filtered load sub-stages. Here, a first filtered load sub-stage 150-1 is coupled to the output 143 of first circulator 140 and RF energy from the first circulator 140 is passed into a second circulator 152 and directed out to another reflective filter device 155 that is in turn coupled to an absorbing load termination 157.

Within the filtered load sub-stage 150-1, its second reflective filter device 155 has a cutoff frequency that is also tuned to pass frequency F2 into an absorbing load termination 157 while RF energy at frequency F1 is almost entirely reflected with negligible loss back into the second circulator 152. As before, there may still be some reflected power at F2 from the second reflective filter device 155 back into the second circulator 152, but it will emerge still further attenuated, for example on the order of another 20 dBm. That is, any remaining energy at frequency F2 at this point would be attenuated from the initial 0 dBm power level down to about −40 dBm.

The RF energy reflected back into the second circulator 152, will travel around and exit the second circulator 152 at output port 159 and exit multiplexer 100 at multiplexer output port 160. As a result, the signal exiting the second frequency stage 105-2 of RF multiplexer 100 at port 160 will comprise frequency component F1 with nearly no loss (0 dBm) while the frequency F2 signal that entered the second stage 150-2 will be considerably attenuated, for example to −40 dBm which for many applications would be below a negligible noise level. If a greater amount of attenuation of frequency F2 is desired, then the second stage 105-2 may further comprise one or more additional filtered load sub-stages 150 in series after sub-stage 150-1 that further attenuate frequency F2 while reflecting F1 in the same manner as described with the first filtered load sub-stage 150-1.

Because the signal exiting the second frequency stage 105-2 effectively comprises just the frequency F1 signal, no further filtering is required and that signal may be passed out of multiplexer 100 at multiplexer output port 160. Although RF multiplexer 100 is described as being implemented using high pass reflective filter elements, it may also instead be implemented where each of the described reflective filter elements are low pass reflective filter elements. In that case, the incoming signal 110 is defined as comprising three signals each in a separate frequency band referred to herein as frequency 1 (F1) frequency 2, (F2) and frequency 3 (F3), where F1>F2>F3.

Figure 2:
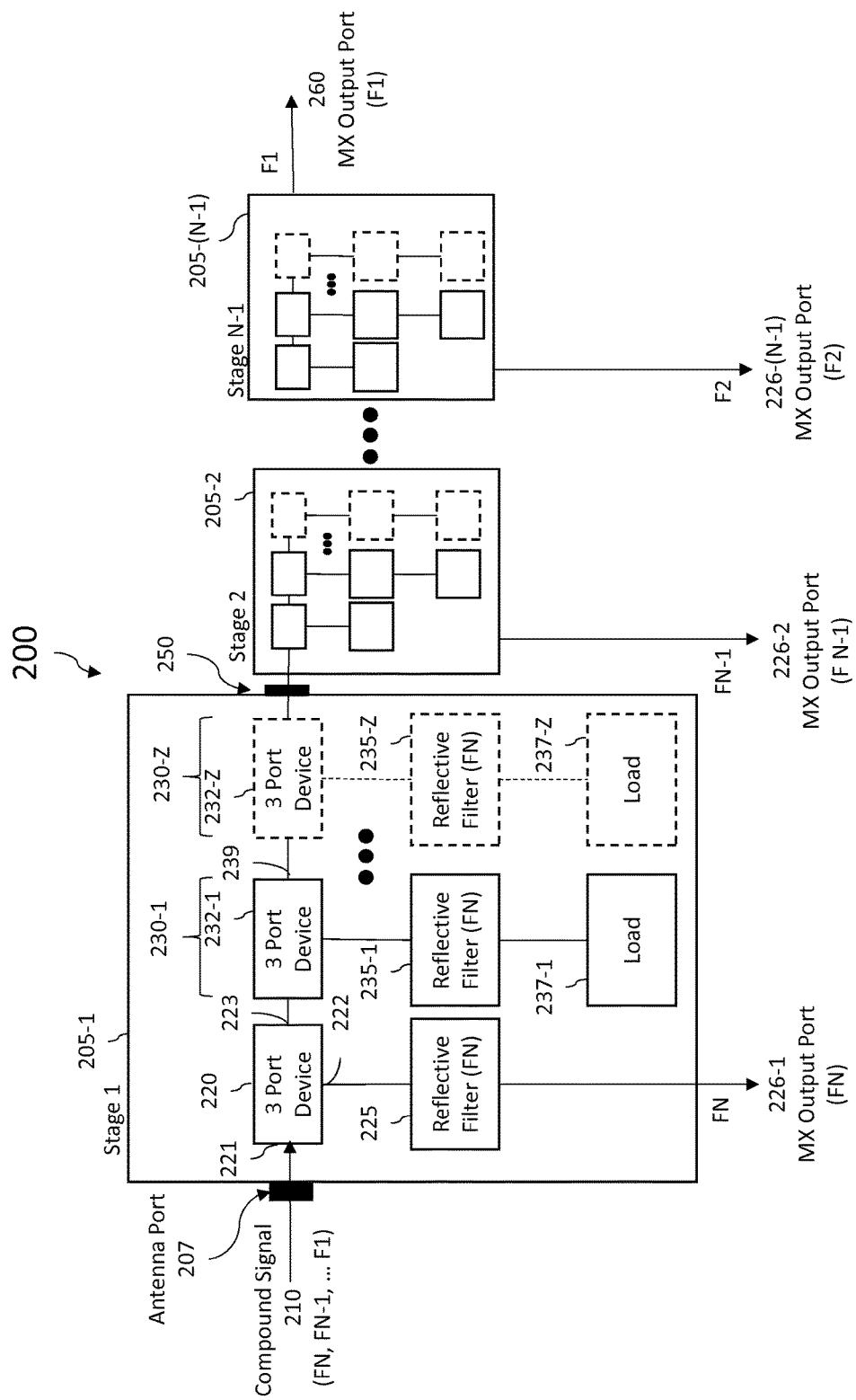
FIG. 2 is a diagram of an generalized RF energy multiplexer of one embodiment of the present disclosure.

FIG. 2 is a diagram of an RF energy multiplexer 200 of one embodiment of the present disclosure that illustrates a general case of RF multiplexer 100 discussed above. As such, the descriptions of the elements of RF multiplexer 100 apply to like named or otherwise corresponding elements in RF multiplexer 200. In the embodiment shown in FIG. 2, 3-port devices are specified to perform the functions of the circulator elements described in FIG. 1. As such, the 3-port devices may be implemented using circulators as described in FIG. 1, or alternately implemented using devices such as, but not limited to, directional filters, transmission line junctions or tee junctions or manifolds. Further, the reflective filter devices are generalized and may be implemented in RF multiplexer 200 using high pass or low pass filters.

RF multiplexer 200 comprises a plurality of N-1 frequency stages 205-1 to 205-(N-1) (collectively referred to as 205) in order to accommodate an input signal 210 comprising N frequency bands or channels. Each of the cascading frequency stages 205-2 to 205-(N-1) comprise the corresponding components and operate in the corresponding manner described for frequency stage 205-1 for their particular frequency bands. For that reason, only frequency stage 205-1 is discussed in detail.

The incoming signal 210 enters first frequency stage 205-1 and is applied to the input 221 of a first three port device 220. The applied RF energy propagates around to output port 222 and is applied to a first reflective filter element 225. The first reflective filter element 225 has a cutoff frequency and passband tuned to pass signals at frequency FN (and higher if a high pass filter, or and lower if a low pass filter) to multiplexer output port 226-1 while reflecting energy at frequencies outside its passband. The RF signals at frequencies FN-1 to F1 applied to the first filter element 225 are outside the passband and therefore are almost entirely reflected with negligible loss back into the first three port device 220. Any RF power that does leak through first filter element 225 at frequencies FN-1 to F1 to exit multiplexer output 226-1 will be considerably attenuated by filter 225 and negligible, for example by 40 dB or more. As discussed above, there will also be some return loss of RF energy at frequency FN back into three port device 220. For example, in many applications, a return loss at FN on the order of 20 dB could be expected. If this embodiment forgoes the use of bandpass filters in order to optimize weight, size and tuning sensitivity concerns, the multiplexer frequency stage 205-1 needs some other way to absorb the reflected energy at frequency FN before it propagates out from multiplexer frequency stage 205-1. To address this reflected power, multiplexer frequency stage 205-1 comprises one or more filtered load sub-stages 230 (shown in FIG. 2 as sub-stages 230-1 to 230-Z). Here, a first filtered load sub-stage 230-1 is coupled to the output 223 of the three port device 220. This RF energy from the three port device 220 is coupled into a three port device 232-1 and directed out to another reflective filter device 235-1 that is in turn coupled to an absorbing load termination 237-1.

Within the filtered load sub-stage 230-1, the second reflective filter device 235-1 has a cutoff frequency that is also tuned to pass frequency FN into an absorbing load termination 237-1 while RF energy at frequencies FN-1 to F1 are again almost entirely reflected with negligible loss back into the second three port device 232-1. As before, there may still be some reflected power at frequency FN from the second reflective filter device 235-1 back into the second three port device 232-1, but this energy will be still further attenuated, for example on the order of another 20 dB. The RF energy reflected back into the second three port device 232-1 from reflective filter element 235-1 will travel around and exit at the second three port device 232-1 at output port 239. If a greater amount of attenuation of frequency FN is desired, then the first stage 205-1 may further comprise one or more additional filtered load sub-stages 230 in series after sub-stage 230-1 (such as shown at 230-Z which may include 3-port device 232-Z, reflective filter element 235-Z and absorbing load termination 237-Z) that further attenuate frequency FN while reflecting FN-1 to F1 in the same manner as described with the first filtered load sub-stage 230-1. As a result, the signal 250 exiting the first frequency stage 205-1 will comprise RF signal components at frequencies FN-1 to F1 with nearly no loss (0 dBm) while the signal that entered stage 205-1 at frequency FN will be considerably attenuated, for example down to −40 dBm. One or more additional frequency stages shown as 205-2 to 205-(N-1) may be added in series after frequency stage 205-1 to separate out each of the remaining frequencies FN-1 to F1 to corresponding multiplexer output ports 226-2 to 226-(N-1) in the same manner described as stage 205-1. Because the signal exiting the final frequency stage 205-(N-1) effectively comprises just the frequency F1 signal, no further filtering is required and that signal may be passed out of multiplexer 200 at multiplexer output port 260.

Figure 3:
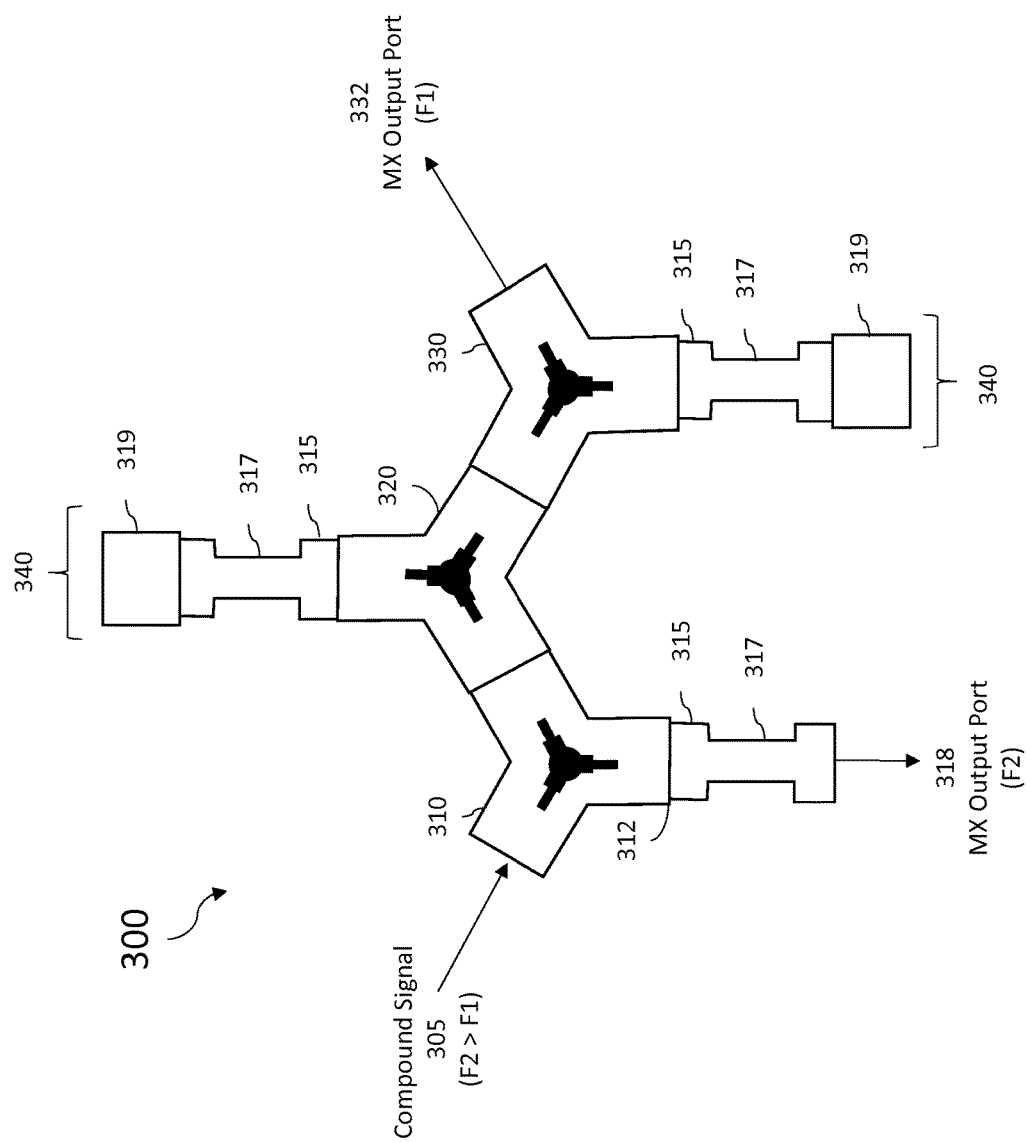
FIG. 3 is a diagram illustrating a multiplexer frequency stage implemented using waveguide circulators of one embodiment of the present disclosure.

FIG. 3 is a diagram illustrating a multiplexer frequency stage 300 implemented using waveguide circulators. In one implementation, multiplexer frequency stage 300 may be utilized without any additional stages to realize a two frequency band RF multiplexer. In other implementations, multiplexer frequency stage 300 may be coupled in series with additional frequency stages to implement an RF multiplexer for three of more frequency bands, such as described above with RF multiplexers 100 and 200. In some implementations, multiplexer frequency stage 300 may be used to implement any of the multiplexer frequency stages described with respect to RF multiplexers 100 and 200 or otherwise in conjunction or combination with those embodiments. As such, descriptions of elements for the embodiments above in FIGS. 1 and 2 apply to like named elements in FIG. 3 and vice versa.

In FIG. 3, multiplexer frequency stage 300 utilizes series coupled ferrite waveguide circulators 310, 320 and 330 for the above described three port devices. The particular embodiment of FIG. 3 illustrates a multiplexer frequency stage 300 comprising two filtered load sub-stages 340. In other implementations, multiplexer frequency stage 300 may comprise one or more filtered load sub-stages 230 coupled in series. Also in this implementation, high pass reflective filter elements 315 each comprise a waveguide filter 317 having a section of narrowing width. Each of the waveguide filters 317 will have a cutoff frequency that acts like a high pass reflective filter element and varies as a function of the width of the waveguide in the waveguide filter 317 regions of the high pass reflective filter elements 315. That is, the more narrow the waveguide in the waveguide filter 317 region the higher the high pass cutoff frequency will be. Attenuation of RF energy passed through the waveguide filter 317 outside the baseband is a function of the length of the waveguide in waveguide filter 317 region. The longer the length, the greater the attenuation. Because the high pass reflective filter elements 315 are implemented using waveguides, the path through the waveguide need not be linear, but may curve, bend, and be serpentined as desired to optimize space utilization.

The incoming compound signal 305 (comprising for example, frequencies F2 and F1 where F2>F1) enters frequency stage 300 and is applied to the input of the first ferrite circulator 310. The applied RF energy propagates around to output port 312 and is applied to a first reflective filter element 315 that has a waveguide filter 317 tuned to pass signals at frequency F2 and higher to multiplexer output port 318 while reflecting energy at frequency F1 outside its passband. Any RF power that does leak through first filter element 315 at frequency to exit multiplexer output 318 will be considerably attenuated by filter 317 and negligible. RF energy at frequency F1 as well as reflected RF energy at frequency F2 will reflect back into the first ferrite circulator 310.

To further attenuate the return loss RF energy at frequency F2 multiplexer frequency stage 300 comprises two filtered load sub-stages 340. In the first of the filtered load sub-stages 340 RF energy from the first ferrite circulator 310 is received at the second ferrite circulator 320 and applied to a second reflective filter device 315 that is in turn coupled to an absorbing load termination 319. RF energy at frequency F1 is reflected by the second reflective filter device 315 while RF energy at frequency F2 is passed to the absorbing load termination 319. As before, there may also be some return loss RF energy at frequency F2 reflected back into the second ferrite circulator 320. Accordingly, in a second of the filtered load sub-stages 340 RF energy from the second ferrite circulator 320 is received at the third ferrite circulator 330 and applied to a third reflective filter device 315 that is in turn coupled to an absorbing load termination 319. Each filtered load sub-stages 340 will cumulatively attenuate any reflective loss at frequency F2 in multiplexer frequency stage 300. For example, for sub-stages 340 that each provide 20 dB of attenuation at the target frequency, having two sub-stages 340 will provide 40 dB attenuation while having five sub-stages 340 will provide 100 dB attenuation. The signal exiting at MX output port 332 will comprise the input signal 305 minus the component separated out to MX output port 318. In this case, since the compound signal comprised F2+F1 and F2 was separated out to MX output port 318, then the signal that exits MX output port 332 comprises F1.

Figure 4:
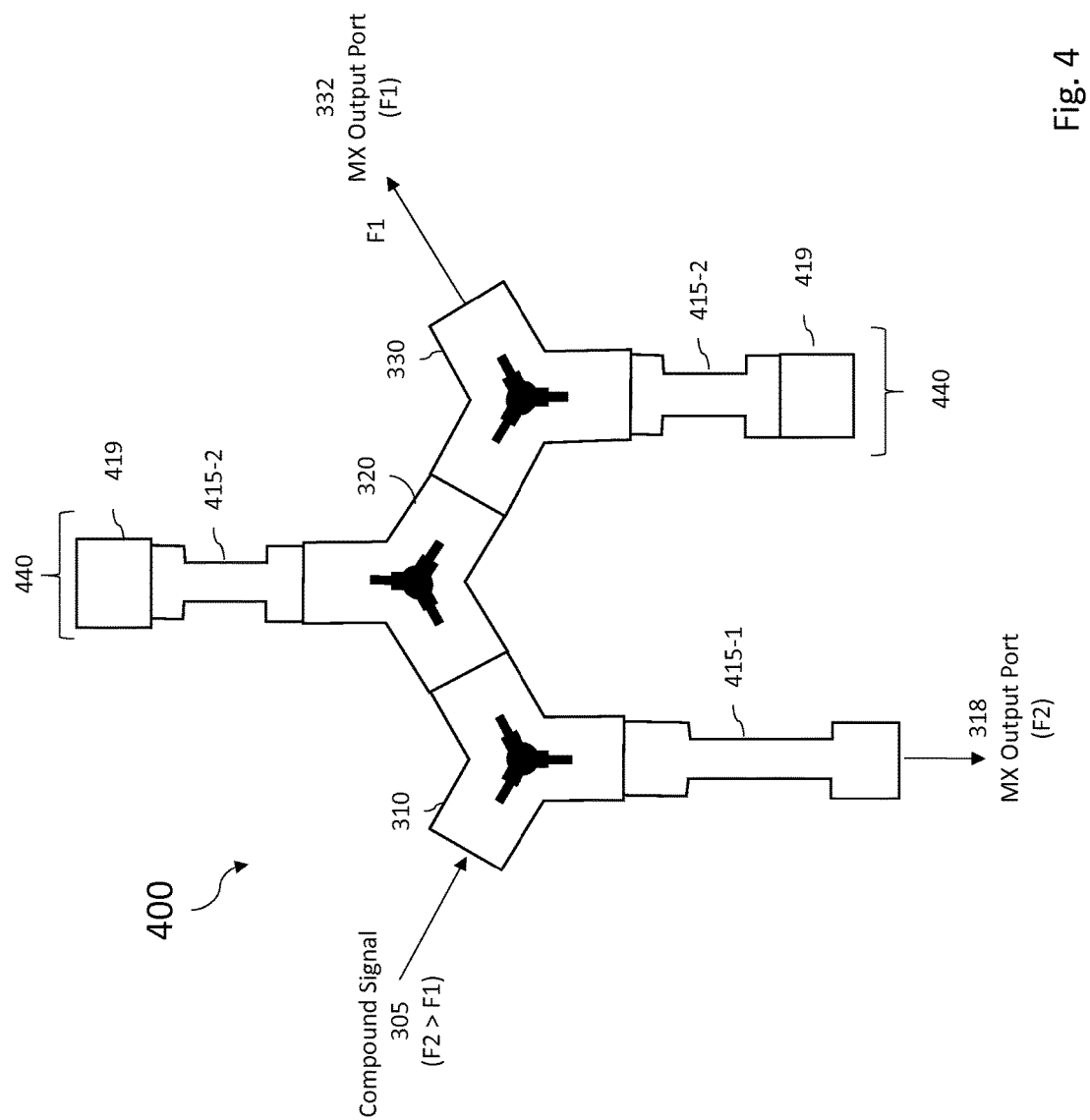
FIG. 4 shows a variation of one embodiment of a multiplexer frequency stage of the present disclosure.

FIG. 4 shows at 400 variation of any of the above multiplexer frequency stages where the reflective filter devices 415 are not exact duplicates of each other. Since only the reflective filter device in each stage coupled to a multiplexer output port 318 needs to reject transmission of out-of-passband frequency signals, the subsequent reflective filter devices 415-2 in the filtered load sub-stages 440 could be simpler filters than reflective filter device 415-1. That is, the filtered load sub-stages 440 need to provide a similar reflection response to out-of-passband frequency signals, but not necessarily the same transmission response to output 318 connected to reflective filter device 415-1 because they terminate into absorbing load terminations 419 rather than provide output signals. In the particular example illustrated in FIG. 4, the reflective filter devices 415-2 filters are, for example, 1 inch shorter than the reflective filter device 415-1.

Figure 5:
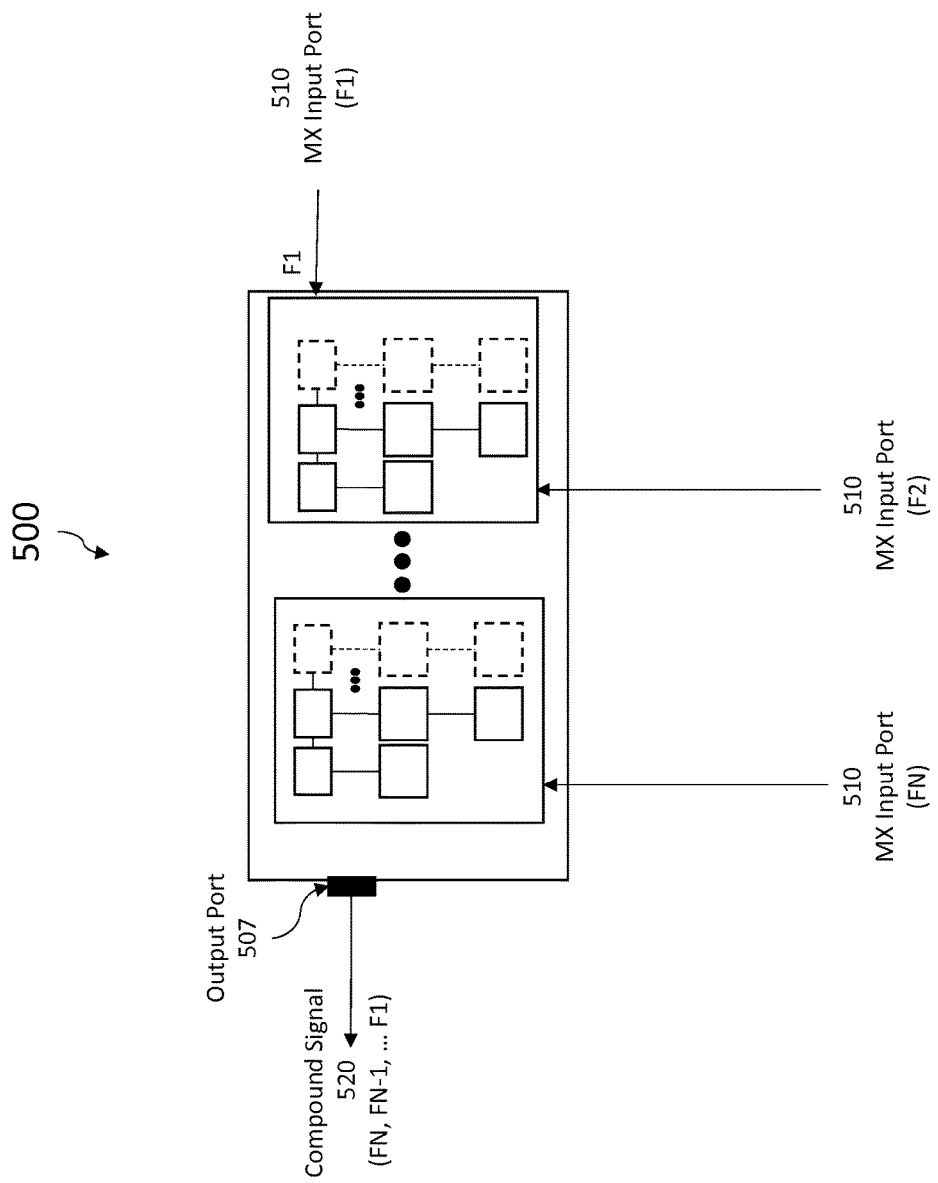
FIG. 5 is a diagram of an generalized RF energy multiplexer of one embodiment of the present disclosure where multiple inputs are combined to output a compound signal.

As illustrated by FIG. 5, it should be noted that in any of the embodiments described above, the RF multiplexer could be used in receive or transmit configurations. That is, FIGS. 1-4 illustrate a multi-frequency signal input separated out to each of the multiplexer output ports.

RF multiplexer 500 may be implemented in conjunction with or combination with any of the other embodiments described herein. As such, descriptions of elements for those other embodiments apply to like named elements in FIG. 5 and vice versa. In FIG. 5, RF multiplexer 500 may be implemented using the RF multiplexers and frequency stages described above where individual frequency signals are input to frequency specific input ports 510 (previously described as the multiplexer output ports above) and the combined signal 520 is output at an output port 507 (previously described as the antenna input port above). Any of the input or output ports discussed herein may be connected directly to an antenna or to other components common to a transmit or receive chain, such as frequency converters or amplifiers.

Figure 6:
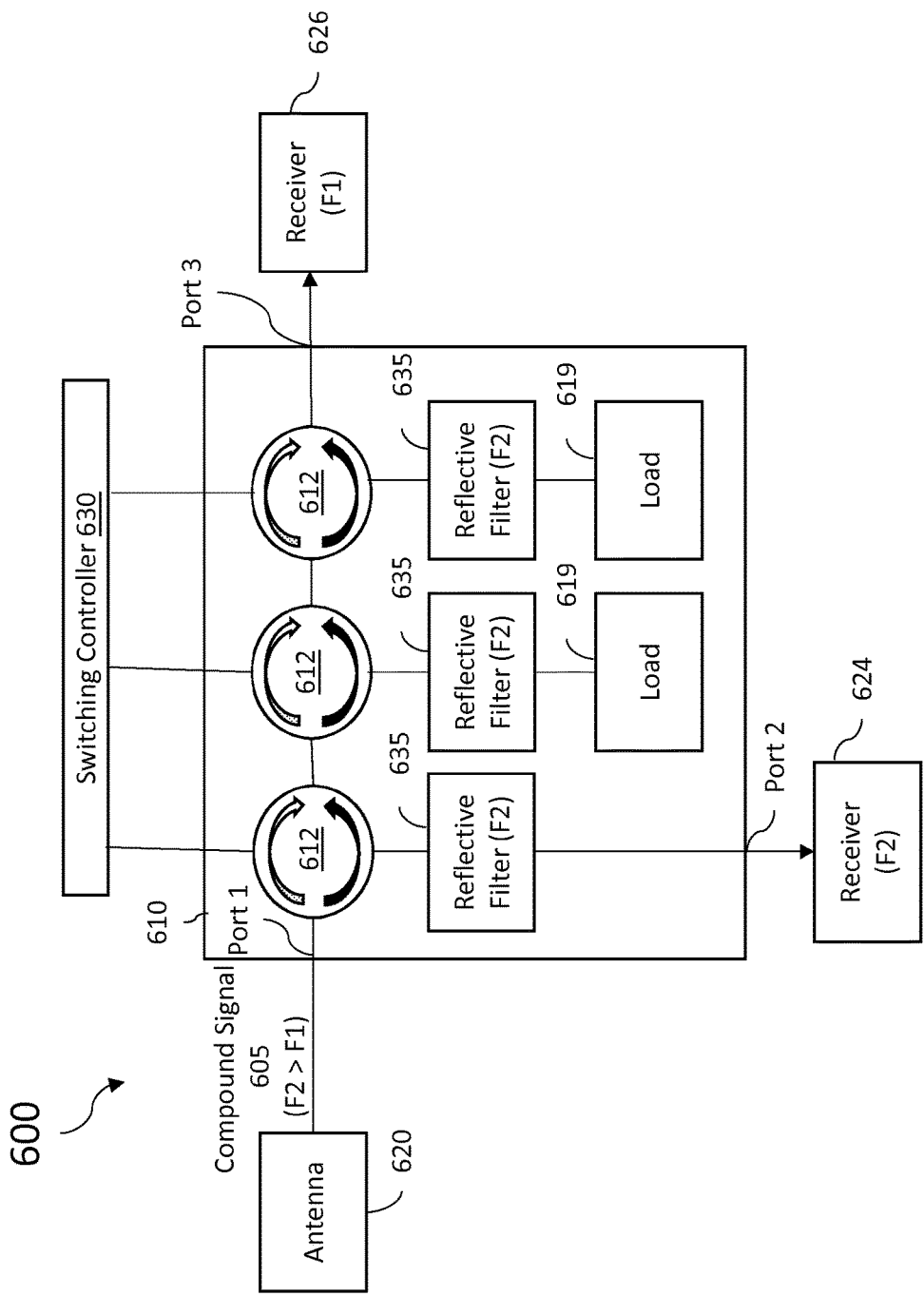
FIG. 6 is a diagram of a radio frequency (RF) system utilizing an RF energy multiplexer of one embodiment of the present disclosure.

FIG. 6 is a diagram of a radio frequency (RF) system 600 wherein an RF multiplexer 610 utilizes switchable circulators 612 controlled by a switching controller 630. RF multiplexer 610 may be implemented in conjunction with or combination with any of the other embodiments described herein. As such, descriptions of elements for those other embodiments apply to like named elements in FIG. 6 and vice versa. In this example, Port 1 of RF multiplexer 610 is coupled to an antenna 620, Port 2 is coupled to a first receiver 624 (tuned to operate at frequency F2), and Port 3 is coupled to a second receiver 626 (tuned to operate at frequency F1). The circulator switches 612 may be operated together in lock-step. In a first switching state (shown by the solid block arrows) a compound RF signal 605 comprising both F1 and F2 may be simultaneously received and provided to receivers 624 and 626 in the manner described for any of the frequency stages above, separating out F2 at Port 2 and F1 at Port 3 by reflecting frequencies not passed by the reflective filters 635. If there are times when only the F1 signal is being received, the circulators 612 leading from the antenna 620 to the F1 port (Port 3) are simply switched in the direction to bypass the reflective filters 635 and absorbing load terminations 619 (shown by the white arrows) and pass the signal directly to second receiver 626 with no filtering. When switched back to the first state (shown by the solid black arrows), the network once again operates as a diplexer.

Figure 7:
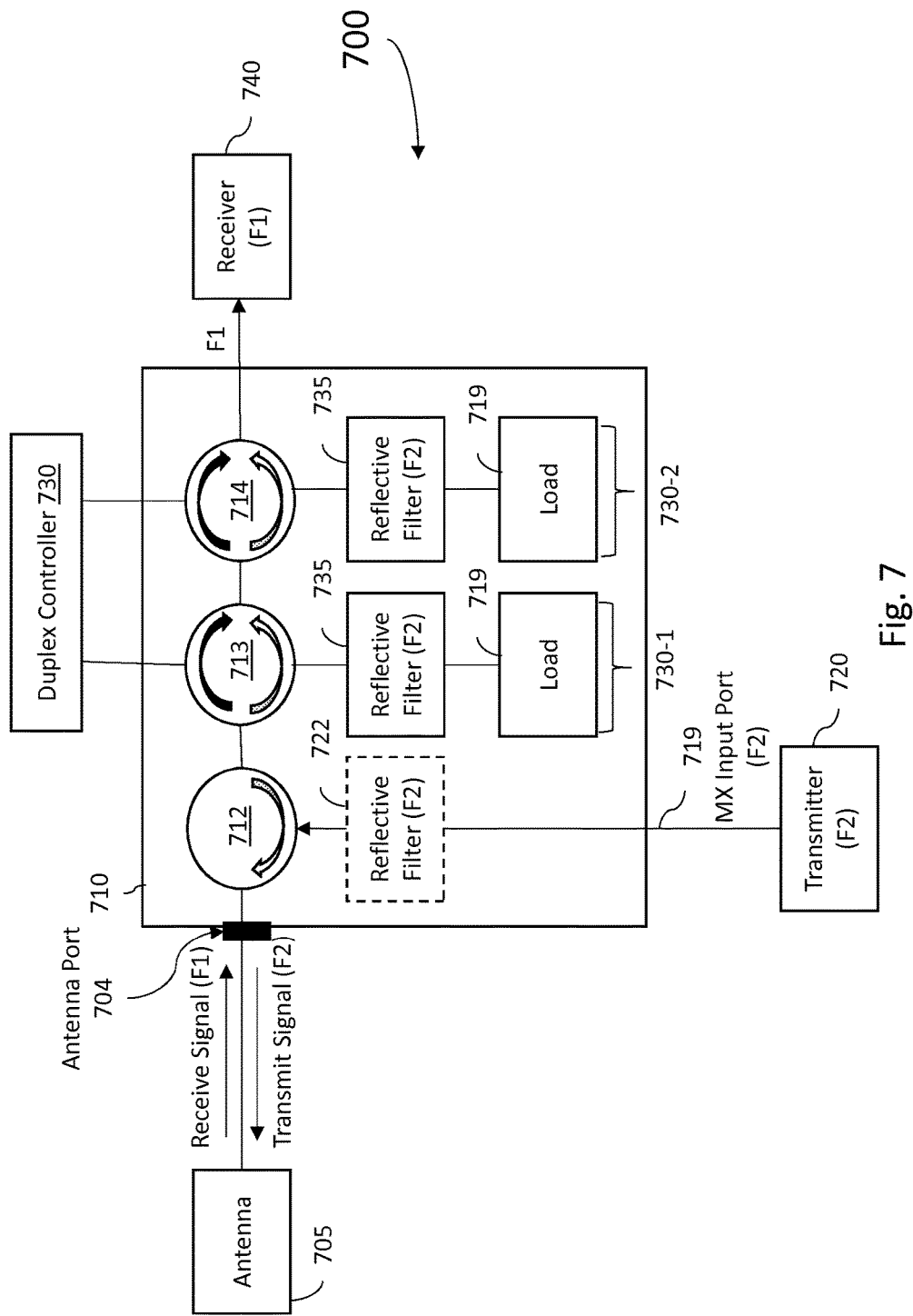
FIG. 7 is a diagram of a another radio frequency (RF) system utilizing an RF energy multiplexer of one embodiment of the present disclosure.

FIG. 7 is a diagram illustrating another embodiment of a system 700 comprising an RF multiplexer 710 of the present disclosure through which one frequency (F2) is transmitted out an antenna 705 and a second frequency (F1) is received in through the antenna 705. RF multiplexer 710 comprises a first circulator 712, a second circulator 713 and a third circulator 714. In other embodiments, these circulators may be implemented by other three port devices as described above in FIG. 2. RF multiplexer 710 may also be implemented in conjunction with or combination with any of the other embodiments described herein. As such, descriptions of elements for those other embodiments apply to like named elements in FIG. 7 and vice versa. The first circulator 712 is connected to a transmitter 720 (via MX input port 719) and the antenna 705 (via port 704) with the first circulator 712 acting as a duplexer, simultaneously passing transmitted and received signals regardless of their frequency. An optional first high pass reflective filter element 722 may be connected between the first circulator 712 and port 719 to prevent the signal received at antenna 705 at frequency F1 from reaching transmitter 720.

The cascaded filtered load sub-stages 730-1 and 730-2 comprise the respective circulators 713 and 714 coupled to reflective filter elements 735 and absorbing load terminations 719. In other implementations, there may be a fewer or greater number of filtered load sub-stages depending on the degree of attenuation desired. The sub-stages are used to reduce to an acceptable level any of the transmitted F2 signal that leaks through circulator 712 to arrive at the Receiver port 740. In this embodiment, circulators 713 and 714 each comprise circulator switches. The circulator switches 713 and 714 may be operated together in lock-step.

In one implementation, system 700 may be switched between a half-duplex mode and a full-duplex mode, by switching circulators 713 and 714 between direction states using a duplex controller 730 coupled to magnetizing windings of switching circulators 713 and 714. In the first, or half-duplex, operating state (shown by the solid arrows) where no transmission from transmitter 720 is expected, the signals received at antenna 705 circulate clockwise through circulator switches 712, 713 and 714 to bypass the reflective filter elements 735 during signal reception. This state improves reception by avoiding unnecessary insertion losses associated with inputting the signal through each of the circulators multiple times. In the second, or full-duplex mode, (shown by the white arrows), simultaneous transmission and reception is possible, because any reflected RF from the transmission of frequency F2 will be passed into the cascaded filtered load sub-stages 730-1 and 730-2 for attenuation before it reaches receiver 740. However, in the full-duplex mode, signals at frequency F1 received at antenna 705 will also be passed into the cascaded filtered load sub-stages 730-1 and 730-2 and the resulting signal at frequency F1 received at receiver 740 will have some loss as compared to what would be received if RF multiplexer 710 were operated in half duplex mode. That is, in full-duplex mode, the reflecting filter elements 735 will keep damaging high power RF energy at frequency F2 from reaching the receiver 740, while reflecting F1 so that is passes to receiver 740. However, full duplex mode also involves a greater number of insertions of the signal at frequency F1 through the circulators, resulting in at least some additional loss.

It is also expressly contemplated that any of the embodiments described here that utilize or are otherwise implemented using ferrite waveguide circulators may comprise frequency selective circulators and/or circulator switches such as those described in U.S. Pat. No. 8,947,173. In such implementations, the frequency selective circulators will have different frequency performance characteristics depending on the path travelled through the circulator between its ports. By utilizing frequency selective circulators and/or circulator switches for three port devices of an RF multiplexer, the circulators can be oriented and ports assigned in order to further attenuate or facilitate transmission of specific frequencies between multiplexer frequency stages. It should be understood that any of the circulators illustrated in any of the figures may optionally represent a frequency selective circulator.

Figure 8:
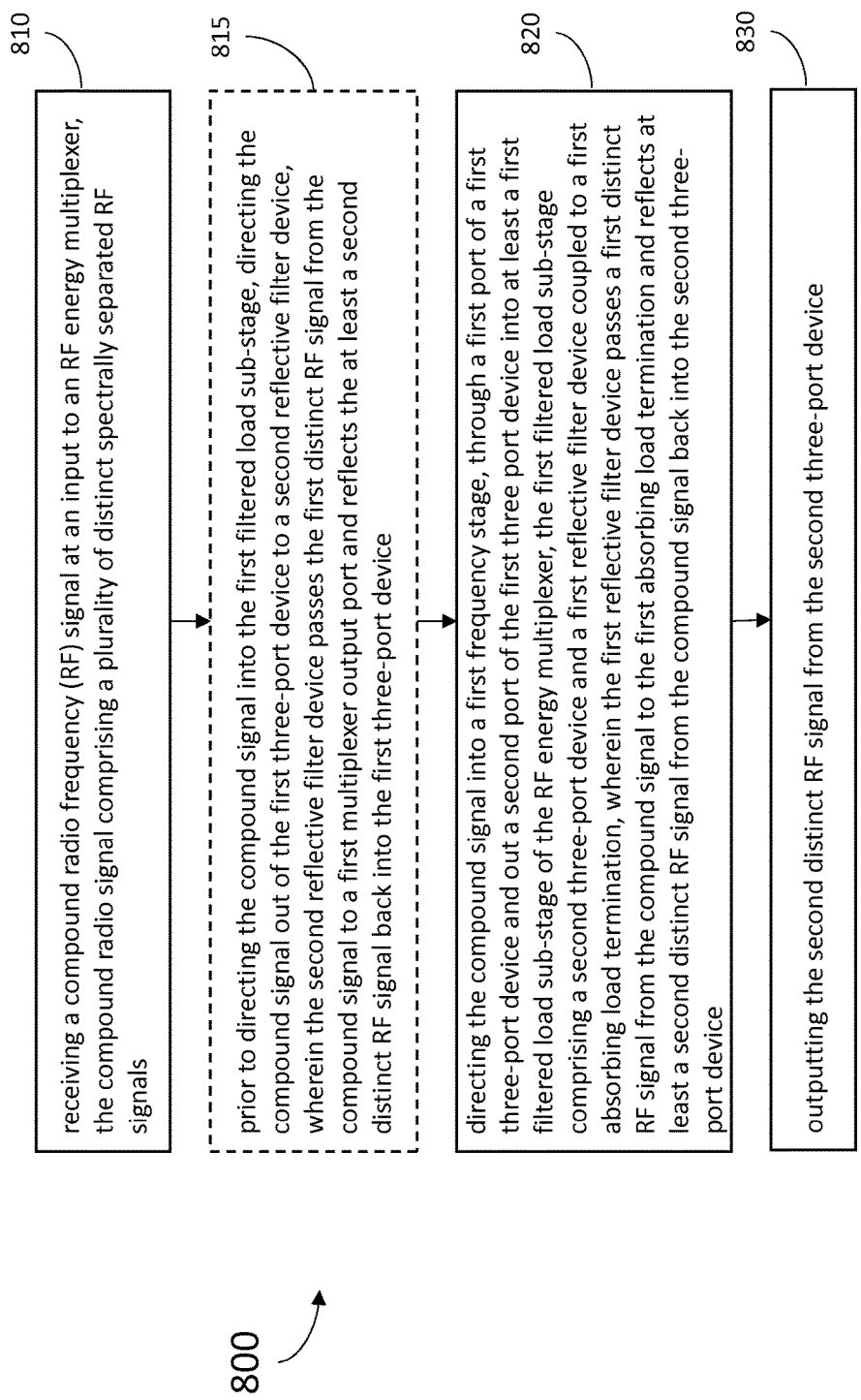
FIG. 8 is a diagram illustrating a method of one embodiment of the present disclosure.

FIG. 8 is a flow chart illustrating a method 800 of one embodiment of the present disclosure. It should be understood that method 800 may be implemented using any one of the embodiments described above in FIG. 1-7. As such, elements of method 800 may be used in conjunction with, in combination with, or substituted for elements of the embodiments described above. Further, the functions, structures and other description of elements for such embodiments described above may apply to like named elements of method 800 and vice versa.

The method begins at 810 with receiving a compound radio frequency (RF) signal at an input to an RF energy multiplexer, the compound radio signal comprising a plurality of distinct spectrally separated RF signals. In one embodiment, the compound RF signal is an RF signal received at an input port to the RF energy multiplexer comprising an antenna port. For example, in the embodiments of FIGS. 1-4 and 6, the compound signal comprises multiple RF signals received at an antenna and delivered to an input of the respective RF energy multiplexers. In other embodiments, the compound signal may comprise at least one component reflected back into the RF energy multiplexer from the input port. For example, in the embodiment of FIG. 7, one component of the compound signal received into the antenna port 704 may actually comprise reflected RF energy caused by the transmission at frequency F2 by transmitter 720. In other embodiments, the compound signal may comprise a plurality of RF signals each applied to separate inputs of the RF energy multiplexer, such as illustrated in FIG. 5.

The method proceeds to 820 with directing the compound signal into a first frequency stage, through a first port of a first three-port device and out a second port of the first three port device into at least a first filtered load sub-stage of the RF energy multiplexer, the first filtered load sub-stage comprising a second three-port device and a first reflective filter device coupled to a first absorbing load termination, wherein the first reflective filter device passes a first distinct RF signal from the compound signal to the first absorbing load termination and reflects at least a second distinct RF signal from the compound signal back into the second three-port device. As explained above, each filtered load sub-stage is designed to significantly attenuate (e.g. at least −20 dB) a specific RF signal and reflect other RF signals with little attenuation so that the reflected RF signals may pass through the filtered load sub-stage and exit either to: an output of the multiplexer, another filtered load sub-stage, or another frequency stage used to separate out another specific RF signal from the remaining signals in the compound signal. As mentioned above, the reflective filter elements may comprise either high pass or low pass filters. In some implementations, pass band filters may be used although their utilization introduces size restraints and other complexities that make such implementations sub-optimum but still workable. The three port devices may be implemented, for example using circulators, ferrite waveguide circulators, ferrite waveguide circulator switches, frequency selective circulators and/or circulator switches, directional filters, transmission line junctions or tee junctions or manifolds, or combinations thereof.

The method proceeds to 830 with outputting the second distinct RF signal from the second three-port device. As mention above, the signal emerging from the third port may exit either to: an output of the multiplexer, another filtered load sub-stage (in which case the method would repeat 820 for each of the subsequence sub-stages), or another frequency stage used to separate out another specific RF signal from the remaining signals in the compound signal (in which case the method would repeat 810 and 820 for each RF signal that needs to be separated out from the compound signal entering that frequency stage. The signal exiting the final filtered load sub-stage of the final frequency stage effectively comprises the original compound signal (e.g. the multi-channel signal that originally entered the RF energy multiplexer) minus the signal components that were separated out at each frequency stage of the RF energy multiplexer.

As shown in 815, in one embodiment, the method may optionally comprise (any in many cases will comprise), prior to directing the compound signal to the first filtered load sub-stage at block 820, directing the compound signal out of the first three-port device to a second reflective filter device, wherein the second reflective filter device passes the first distinct RF signal from the compound signal to a first multiplexer output port and reflects the at least a second distinct RF signal back into the first three-port device. This may be the case for implementing embodiments such as shown in FIGS. 1-4 and 6 where at each frequency stage of the RF energy multiplexer it is desired to output from the multiplexer a certain spectrum of the compound signal before attenuating that spectrum through a filtered load sub-stage.

EXAMPLE EMBODIMENTS

Example 1 includes a radio frequency (RF) energy multiplexer, the multiplexer comprising: a first multiplexer stage that includes: a first three port device coupled to a first port of the multiplexer and a first reflective filter device, wherein the first reflective filter device is configured with a first pass band that passes RF energy at a first frequency F1, and reflects RF energy at at least one of a second frequency F2 outside of the first pass band back into the first three port device; and at least a first filtered load sub-stage coupled to a third port of the first three port device, the first filtered load sub-stage comprising a second three port device coupled to a second reflective filter device and a first absorbing load termination, where the second reflective filter device passes RF energy at the first frequency F1 to the first absorbing load termination and reflects RF energy at the at least one of a second frequency F2 outside of the first pass band back into the second three port device.

Example 2 includes the multiplexer of example 1 having a second filtered load sub-stage coupled to a third port of the second three port device, the second filtered load sub-stage comprising a third three port device coupled to a third reflective filter device and a second absorbing load termination load, where the third reflective filter device has a first pass band that passes RF energy at the first frequency F1 to the first absorbing load termination and reflects RF energy at the at least one of a second frequency F2 outside of the first pass band back into the second three port device.

Example 3 includes the multiplexer of any of examples 1-2, wherein the first and second three port devices each comprise: a circulator, a ferrite waveguide circulator, a ferrite waveguide circulator switch, a frequency selective circulator, a frequency selective circulator switch, a directional filter, a transmission line junction, a tee junction, or a manifold.

Example 4 includes the multiplexer of any of examples 1-3, wherein the reflective filter elements comprises either a high pass filter or a low pass filter.

Example 5 includes the multiplexer of any of examples 1-4, wherein the first three-port device comprises a first waveguide circulator, and the first reflective filter element comprises a first waveguide having at least one length of narrowed-width waveguide.

Example 6 includes the multiplexer of example 5, wherein the second three-port device comprises a second waveguide circulator coupled to an output of the first waveguide circulator, and the second reflective filter element comprises a second waveguide having at least one length of narrowed-width waveguide.

Example 7 includes the multiplexer of any of examples 1-6, wherein the first reflective filter device and the second reflective filter device have different filter characteristics.

Example 8 includes the multiplexer of any of examples 1-7, wherein the first three port device comprises a ferrite circulator switch configured to switch states in lock-step with the second three port device.

Example 9 includes the multiplexer of any of examples 1-8, further comprising a duplex controller coupled to the second three port device, wherein the second three port device comprises a circulator switch, and wherein the duplex controller is configured to switch the circulator switch between first and second circulation direction states.

Example 10 includes a method for a radio frequency energy multiplexer, the method comprising: receiving a compound radio frequency (RF) signal at an input to an RF energy multiplexer, the compound radio signal comprising a plurality of distinct spectrally separated RF signals; directing the compound signal into a first frequency stage, through a first port of a first three-port device and out a second port of the first three port device into at least a first filtered load sub-stage of the RF energy multiplexer, the first filtered load sub-stage comprising a second three-port device and a first reflective filter device coupled to a first absorbing load termination, wherein the first reflective filter device passes a first distinct RF signal from the compound signal to the first absorbing load termination and reflects at least a second distinct RF signal from the compound signal back into the second three-port device; and outputting the second distinct RF signal from the second three-port device.

Example 11 includes the method of example 10, further comprising: prior to directing the compound signal into the first filtered load sub-stage, directing the compound signal out of the first three-port device to a second reflective filter device, wherein the second reflective filter device passes the first distinct RF signal from the compound signal to a first multiplexer output port and reflects the at least a second distinct RF signal back into the first three-port device.

Example 12 includes the multiplexer of example 11, wherein the first reflective filter device and the second reflective filter device have different filter characteristics.

Example 13 includes the method of any of examples 11-12, wherein the first reflective filter device and the second reflective filter device each comprise either a high pass filter or a low pass filter.

Example 14 includes the method of any of examples 10-13, wherein the first and second three port devices each comprise circulator switches, the method further comprising: switching the first three port device in lock-step with the second three port device.

Example 15 includes the method of any of examples 10-14, wherein the first and second three port devices each comprise one of: a circulator, a ferrite waveguide circulator, a ferrite waveguide circulator switch, a frequency selective circulator, a frequency selective circulator switch, a directional filter, a transmission line junction, a tee junction, or a manifold.

Example 16 includes the method of any of examples 10-15, wherein the second three-port device comprises a waveguide circulator, and the first reflective filter element comprises a waveguide having at least one length of narrowed-width waveguide.

Example 17 includes the method of any of examples 10-16, wherein the second three port device comprises a circulator switch, the method further comprising: switching the second three port device using a duplex controller between a first and a second circulation direction state.

Example 18 includes the method of any of examples 10-17, further comprising at least one of: outputting the second distinct RF signal from the RF energy multiplexer; outputting the second distinct RF signal to a second filtered load sub-stage of the first frequency stage; or outputting the second distinct RF signal to a second frequency stage of the RF energy multiplexer.

Example 19 includes a radio frequency (RF) device, the device comprising: a first port that receives a first RF signal from an antenna of a first frequency F1; a second port that outputs a second RF signal of a second frequency F2 received via the first port; a multiplexer having a first multiplexer frequency stage that includes: a first three-port device coupled to the first port and a first reflective filter device, wherein the first reflective filter device is configured with a pass band that passes RF energy at the first frequency F1, and substantially reflects RF energy including at least the second frequency F2 outside the pass band back into the first three port device; and at least a first filtered load sub-stage coupled to a third port of the first three port device, the first filtered load sub-stage comprising a second three port device coupled to a second reflective filter device and a first absorbing load termination, where the second reflective filter device passes RF energy at the first frequency F1 to the first absorbing load termination and reflects RF energy including at least the second frequency F2 outside of the second pass band back into the second three port device.

Example 20 includes the device of example 19, wherein at least the second three-port device comprises a circulator switch, the device further comprising: a switching controller coupled to the second three-port device and configured to switch the second three port device between a first and a second circulation direction state.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A radio frequency (RF) energy multiplexer, the multiplexer comprising:
    a first multiplexer stage that includes:
        a first three port device having a first port coupled to a first port of the multiplexer and having a second port coupled to a first reflective filter device, wherein the first reflective filter device is configured with a first pass band that passes RF energy at a first frequency F1, and reflects RF energy at at least one of a second frequency F2 outside of the first pass band back into the first three port device; and
        a first filtered load sub-stage coupled to a third port of the first three port device, the first filtered load sub-stage comprising a second three port device coupled to a second reflective filter device and a first absorbing load termination, where the second reflective filter device passes RF energy at the first frequency F1 to the first absorbing load termination and reflects RF energy at the at least one of a second frequency F2 outside of the first pass band back into the second three port device.

2. The multiplexer of claim 1 having a second filtered load sub-stage coupled to a third port of the second three port device, the second filtered load sub-stage comprising a third three port device coupled to a third reflective filter device and a second absorbing load termination load, where the third reflective filter device has a first pass band that passes RF energy at the first frequency F1 to the first absorbing load termination and reflects RF energy at the at least one of a second frequency F2 outside of the first pass band back into the second three port device.

3. The multiplexer of claim 1, wherein the first and second three port devices each comprise:
    a circulator, a ferrite waveguide circulator, a ferrite waveguide circulator switch, a frequency selective circulator, a frequency selective circulator switch, a directional filter, a transmission line junction, a tee junction, or a manifold.

4. The multiplexer of claim 1, wherein the first reflective filter device comprises either a high pass filter or a low pass filter.

5. The multiplexer of claim 1, wherein the first three-port device comprises a first waveguide circulator, and the first reflective filter device comprises a first waveguide having at least one length of waveguide that narrows in width relative to another region of the first waveguide.

6. The multiplexer of claim 5, wherein the second three-port device comprises a second waveguide circulator coupled to an output of the first waveguide circulator, and the second reflective filter device comprises a second waveguide having at least one length of waveguide that narrows in width relative to another region of the first waveguide.

7. The multiplexer of claim 1, wherein the first reflective filter device and the second reflective filter device have different filter characteristics.

8. The multiplexer of claim 1, wherein the first three port device comprises a ferrite circulator switch configured to switch states in lock-step with the second three port device.

9. The multiplexer of claim 1, further comprising a duplex controller coupled to the second three port device, wherein the second three port device comprises a circulator switch, and wherein the duplex controller is configured to switch the circulator switch between first and second circulation direction states.

10. A method for a radio frequency energy multiplexer, the method comprising:
    receiving a compound radio frequency (RF) signal at an input to an RF energy multiplexer, the compound radio signal comprising a plurality of distinct spectrally separated RF signals;
    directing the compound signal into a first frequency stage, through a first port of a first three-port device and out a second port of the first three port device into at least a first filtered load sub-stage of the RF energy multiplexer, the first filtered load sub-stage comprising a second three-port device and a first reflective filter device coupled to a first absorbing load termination, wherein the first reflective filter device passes a first distinct RF signal from the compound signal to the first absorbing load termination and reflects at least a second distinct RF signal from the compound signal back into the second three-port device;
    outputting the second distinct RF signal from the second three-port device; and
    prior to directing the compound signal into the first filtered load sub-stage, directing the compound signal out of the first three-port device to a second reflective filter device, wherein the second reflective filter device passes the first distinct RF signal from the compound signal to a first multiplexer output port and reflects the at least a second distinct RF signal back into the first three-port device.

11. The multiplexer of claim 10, wherein the first reflective filter device and the second reflective filter device have different filter characteristics.

12. The method of claim 10, wherein the first reflective filter device and the second reflective filter device each comprise either a high pass filter or a low pass filter.

13. The method of claim 10, wherein the first and second three port devices each comprise circulator switches, the method further comprising:
    switching the first three port device in lock-step with the second three port device.

14. The method of claim 10, wherein the first and second three port devices each comprise one of:

a circulator, a ferrite waveguide circulator, a ferrite waveguide circulator switch, a frequency selective circulator, a frequency selective circulator switch, a directional filter, a transmission line junction, a tee junction, or a manifold.

15. The method of claim 10, wherein the second three-port device comprises a waveguide circulator, and the first reflective filter device comprises a waveguide having at least one length of waveguide that narrows in width relative to another region of the first waveguide.

16. The method of claim 10, wherein the second three port device comprises a circulator switch, the method further comprising:
   switching the second three port device using a duplex controller between a first and a second circulation direction state.

17. The method of claim 10, further comprising at least one of:
   outputting the second distinct RF signal from the RF energy multiplexer;
   outputting the second distinct RF signal to a second filtered load sub-stage of the first frequency stage; or
   outputting the second distinct RF signal to a second frequency stage of the RF energy multiplexer.

18. A radio frequency (RF) device, the device comprising:
   a first port that receives a first RF signal from an antenna of a first frequency F1;
   a second port that outputs a second RF signal of a second frequency F2 received via the first port;
   a multiplexer having a first multiplexer frequency stage that includes:
      a first three-port device having a first port coupled to the first port and having a second port coupled to a first reflective filter device, wherein the first reflective filter device is configured with a pass band that passes RF energy at the first frequency F1, and substantially reflects RF energy including at least the second frequency F2 outside the pass band back into the first three port device; and
      a first filtered load sub-stage coupled to a third port of the first three port device, the first filtered load sub-stage comprising a second three port device coupled to a second reflective filter device and a first absorbing load termination, where the second reflective filter device passes RF energy at the first frequency F1 to the first absorbing load termination and reflects RF energy including at least the second frequency F2 outside of the second pass band back into the second three port device.

19. The device of claim 18 wherein at least the second three-port device comprises a circulator switch, the device further comprising:
   a switching controller coupled to the second three-port device and configured to switch the second three port device between a first and a second circulation direction state.

* * * * *